Oct. 5, 1965  J. M. BRABANT  3,210,762
METHOD AND SYSTEM FOR LOCATING RADIANT ENERGY SOURCES
Filed Nov. 9, 1961  3 Sheets-Sheet 1

JOHN M. BRABANT
INVENTOR.

BY
ATTORNEY

Oct. 5, 1965   J. M. BRABANT   3,210,762
METHOD AND SYSTEM FOR LOCATING RADIANT ENERGY SOURCES
Filed Nov. 9, 1961   3 Sheets-Sheet 3

JOHN M. BRABANT
INVENTOR.

BY Benjamin DeWitt
ATTORNEY

United States Patent Office 3,210,762
Patented Oct. 5, 1965

3,210,762
METHOD AND SYSTEM FOR LOCATING
RADIANT ENERGY SOURCES
John M. Brabant, Woodland Hills, Calif., assignor, by mesne assignments, to TRW Inc., a corporation of Ohio
Filed Nov. 9, 1961, Ser. No. 151,363
10 Claims. (Cl. 343—100)

This invention relates generally to the locating of objects which radiate or reflect electromagnetic energy, and specifically to a system and method for determining the range and altitude, with respect to the position of a receiver, of such objects when they are producing radio signals or random noise.

When it is desired to determine the location of an object, for example, a satellite, an enemy aircraft or missile, hereinafter referred to as a target craft, ordinary radar techniques may not be available or may have been made ineffective by radar counter-measures. In such event, the target craft may be radiating or reflecting electromagnetic energy, such as communication signals, jamming radar signals, radio noise, or other radio signals.

In the past, many attempts have been made to determine the location of the object by observing the emanating energy. Such attempts have been largely unsuccessful and subject to severe disadvantages, particularly with respect to a determination of the target craft's range from the observer. Finding this range quantity has been difficult, but is not an inherently unsolvable problem. Some of the past attempts have involved a solution of the triangle formed by the direct radio path between an airborne target and an airborne receiver and the indirect path including a point of reflection from the earth's surface.

Some of the past attempts included determining the location of the point of reflection and thence the grazing angle of the reflected portion of the energy. However, the method requires extremely high antenna resolution and critical receiver aircraft attitude control, and, at best, the errors are excessively large for a practical system.

Other attempts have suffered similar disadvantages. Some have required exceedingly complex systems necessitating ground based equipment and data links to aircraft carrying other equipment, which equipment and links are vulnerable to detection and jamming.

It is therefore an object of the present invention to provide a method and system for determining the range of a target craft which are not subject to the disadvantages of the prior art.

It is a further object of the present invention to provide an improved method for determining the elevation angle of a radiating target craft or object with respect to an electromagnetic radiation receiving system.

It is another object to provide such a method and system which accurately and readily measure the grazing angle of the reflective, indirect radio path from the target craft to a receiver location.

It is another object to provide such a method and system for determining readily and accurately the range and altitude of a target craft over a range of the order of 100–200 nautical miles.

It is another object to provide such a system and method which may be entirely passive and not subject to undesired detection or jamming or which may supplement an active radar, whether or not the latter is jammed.

It is another object to provide such a system which is entirely self-contained in one aircraft and which does not depend critically upon the attitude of the receiver aircraft for effectiveness or accuracy.

Very briefly, these objects are achieved by the method and structure of the present invention by utilizing at least the vertically polarized component of the electromagnetic energy emanating from the target craft and received by a receiver both in a direct path and as reflected from the substantially horizontal surface of the earth, for example, the sea. The ratio of the magnitude of the direct and reflected signals of the vertically polarized component of the signal is taken and is a fast varying function of the grazing angle. Under certain conditions, this ratio may be compared with that for the horizontally polarized energy to substantially eliminate errors which may have been caused by such factors as reflective surface roughness and atmospheric effects. The reflective, horizontal surface need not be the sea; it could be terrain or it could be a known atmospheric layer.

The invention further includes a method of and means for determining the path length difference between the direct and reflective radio paths from target craft to receiver location.

The novel features of this invention, as well as the invention itself, both as to its organizations and method of operation, will best be understood from the following description, taken in conjunction with the accompanying drawings presented by way of example only, in which like reference numerals refer to like parts, and in which.

Figure 1:
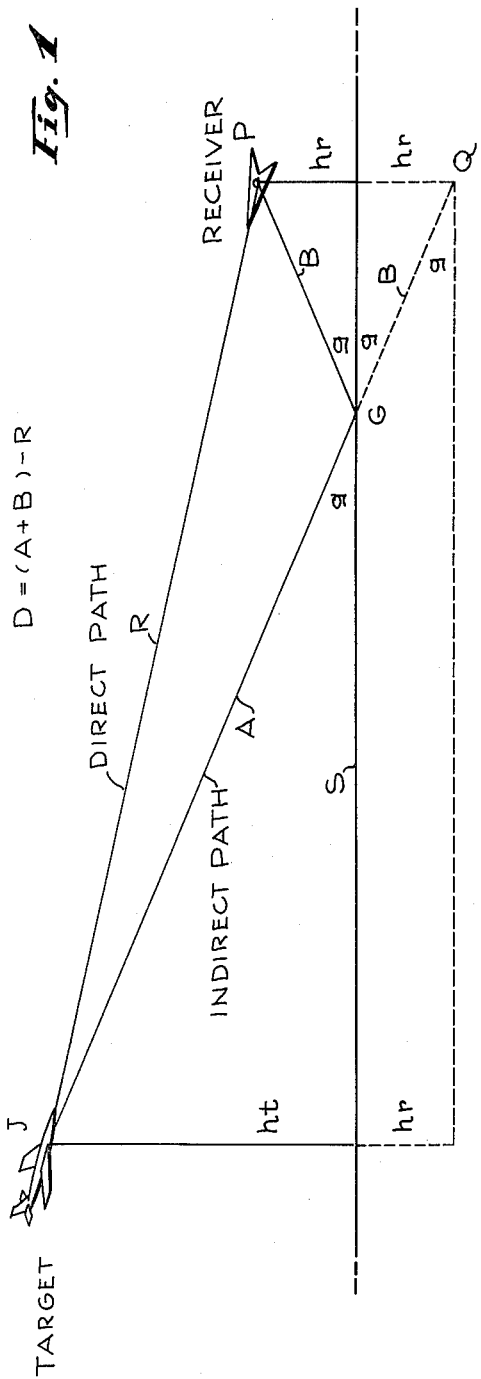
FIGURE 1 is a diagram illustrating the subject location problem and certain known and unknown quantities.

Referring specifically to FIG. 1, there is shown diagrammatically a target craft J at an altitude $h_t$ above a relatively flat, horizontal surface S and at a range R from a receiver P. The receiver is at an altitude $h_r$. The target craft may be an enemy aircraft with a radar jammer, it may be a satellite, or it may be any airborne vehicle whose position is to be determined by other than normal radar techniques. Radar may be ineffective because of jamming or because an operative radar system is not available.

The requirement in the present example is simply that the target craft be producing any detectable radio signal, such as self-generated noise or jamming radar signals.

The surface S is typically sea water, but it may be any relatively horizontal surface, such as prairie type terrain. The line R is the direct path for radiation from the target craft J to the receiver P. The reflected path is line A from the target J to the point of reflection G, and line B from point G to receiver P. The angle $g$ is the grazing angle at which the radiation is reflected from the surface S. For reasons shown below, a point Q is designated adn is the image below surface S of point P above surface S. Thus, obviously, GQ is equal to B and is indicated as such. The line JQ is a straight line and is equal to $A+B$. D is defined as the path length difference between the direct path R and the reflective path $A+B$; or D equals $(A+B)-R$ equals $JQ-JP$; or $R=A+B-D$.

Using triangle JPQ and substituting for $A+B$ in the last equation above, the result is:

$$R = \frac{4h_r^2 - 4h_r D \sin g + D^2}{4h_r \sin g - 2D}$$

Thus, R is a function only of $h_r$, D and g. Of these, $h_r$ is normally known and only D and g need be found. D, as will be shown below, is readily and directly obtained from the correlation process of the invention. Therefore, the only parameter not provided directly is g, which is determined, as shown below, by comparing the vertically and horizontally polarized component of the radiation reflected along the path JGP.

It is also clear from the diagram of FIG. 1 that the target craft altitude $h_t$ is completely determined by D, $h_r$, and g: $(h_t+h_r)=(A+B)$ sin g. And since $(A+B)=D+R$, $h_t=(D+R)$ sin $g-h_r$. Substituting for R, $$h_t = \frac{(4h_r^2 - D^2) \sin g}{4h_r \sin g - 2D} - h_r$$

When the target craft's range and altitude are thus determined, its position with respect to the receiver P is known except for its azimuth angle θ. As indicated in subsequent figures, θ may be supplied from any conventional means, such as, for example, a radio direction finder.

Figure 2:
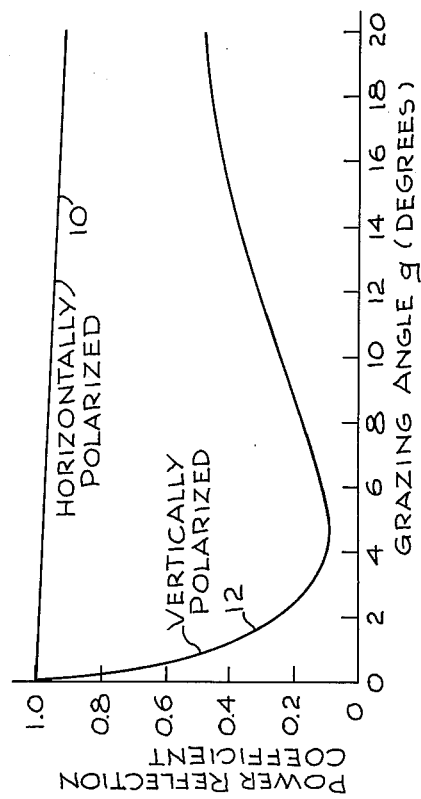
FIG. 2 is a graph of power reflection coefficients for vertically and horizontally polarized radio energy on the ordinate versus grazing angle on the abscissa for a typical reflecting surface, such as the sea.

FIG. 2 is a graph of power reflection coefficient versus grazing angle, which is the complement of what is frequently specified as "reflection angle." Throughout this specification, reflection or grazing angle is the same and is defined as that angle between the reflecting surface and the path of the incident or reflected energy.

On the graph, the ordinate is scaled from "0" to "1," and the abscissa from "0" degrees to "20" degrees. A power coefficient of 1 means that 100% of the incident energy is reflected, and a coefficient of 0.8 means that only 80% of the incident energy is reflected.

A curve 10 represents the variation of the reflection coefficient of horizontally polarized electromagnetic energy as a function of the grazing angle g. It can be readily seen that, for angles in the range of interest, there is very little change in the coefficient of reflection for horizontally polarized energy: even at 20 degrees, approximately 93% of the incident energy is reflected.

The curve 12, however, which plots the reflection coefficient for vertically polarized energy, is not so constant and varies rapidly by an order of magnitude in the range of interest. As will be explained more fully below, the ratio of the reflected, vertically polarized energy to the directly received vertically polarized energy gives information as to the value of g at any instant, which in turn is used, as discussed above in connection with FIG. 1, to determine the location of the emitter of the energy. To eliminate errors which may be introduced as a result of atmospheric and surface effects, the vertically polarized radiation may be normalized to the horizontally polarized radiation by the structure described below.

The data for the curves of FIG. 2 were taken with sea water as the reflecting surface for radio energy at a frequency of 420 megacycles per second. If some other reflecting surface, such as prairie type terrain, is used, then the curves would vary slightly since the reflection coefficient of earth is different from that of sea water.

Figure 3:
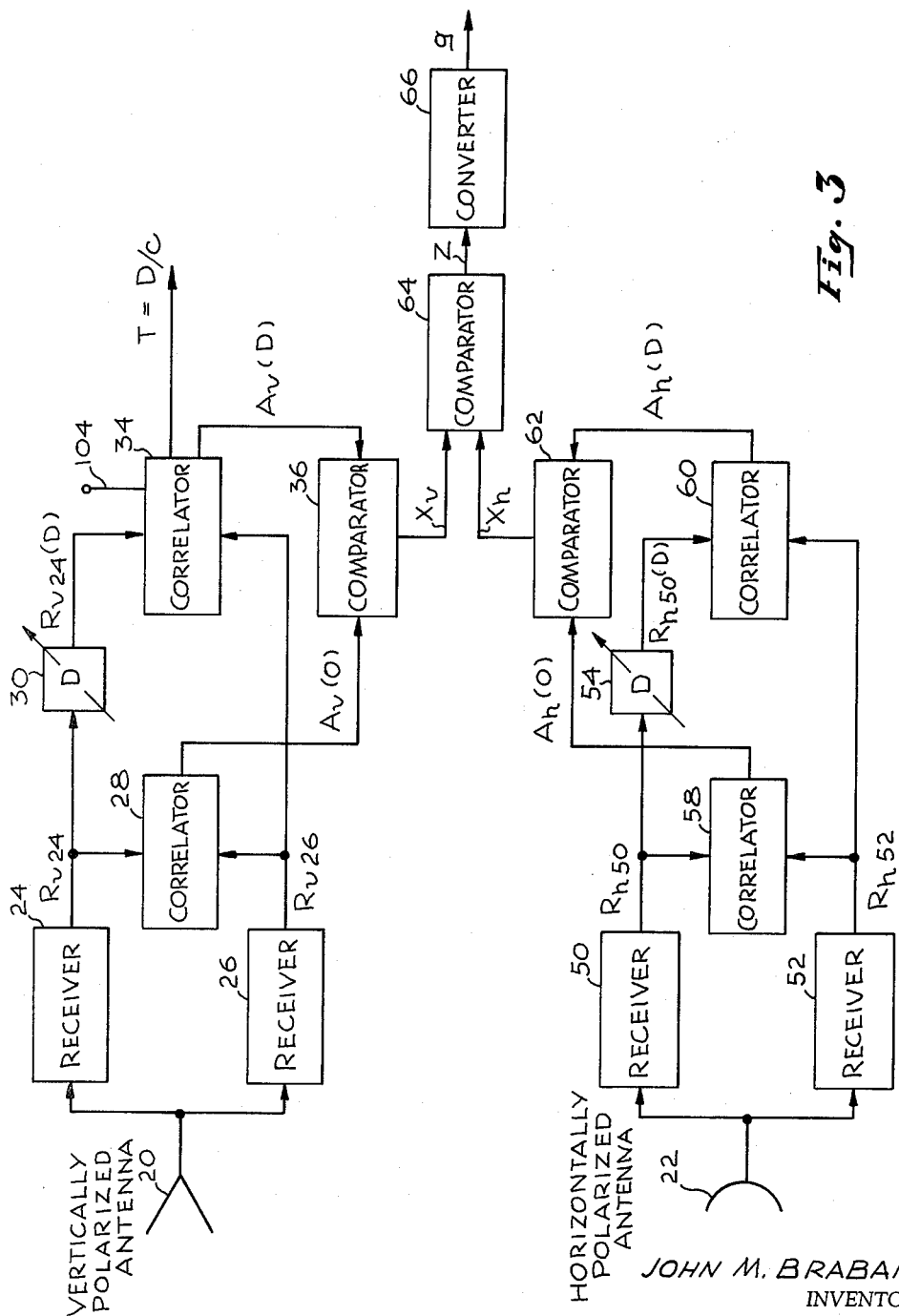
FIG. 3 is a block diagram of a receiving system for determining the grazing angle and path length difference in accordance with the present invention.

Referring to FIG. 3, a receiver system in accordance with one embodiment of the invention is illustrated, in which a pair of antennae 20 and 22 are directed toward the noise transmitter or target craft J. Antenna 20 is vertically polarized and antenna 22 is horizontally polarized. Each has a beamwidth adequate to accept, with approximately equal gain, directly transmitted radiation and reflected radiation at grazing angles in the range of interest from the target craft.

Antenna 20 is coupled to two substantially identical receivers 24, 26. The output terminal of each is coupled to separate input terminals of a correlator 28. The output terminal of the receiver 24 is also connected to a delay line 30, the output terminal of which is then connected to an input terminal of a correlator 34. The output terminal of the receiver 26 is also connected to a separate input terminal of the correlator 34. The output terminals of correlators 34, 28 are each coupled to separate input terminals of a comparator 36.

Horizontally polarized antenna 22 is similarly coupled to two substantially identical receivers 50, 52, and their output terminals are coupled respectively to separate input terminals of a correlator 58. The output terminal of the receiver 50 is also connected to an input terminal of a delay line 54, the output terminal of which is connected to an input terminal of a correlator 60. The output terminal of the receiver 52 is also connected to a separate input terminal of the correlator 60. The output terminals of correlators 58, 60 are coupled to separate input terminals of a comparator 62.

The output terminals of comparators 36, 62 are coupled to separate input terminals of a comparator 64 whose output terminal is coupled to the input of a converter 66.

The correlators 28, 34, 58, and 60 may be conventional multiplier-integrator correlators of the type which provide a direct current output signal whose amplitude at any instant of time is representative of the degree of correlation between the signals impressed upon its input terminals and the combined amplitudes of the signals which manifest the correlation.

The delay lines 30, 54 may be variable quartz delay lines and have a delay range from zero to a few microseconds. The comparators 36, 62, and 64 are conventional amplitude comparators and may be of the type which provide at their output terminals, at any instant of time, the ratio of the amplitudes of the signals on their respective, separate input terminals. The converter 66 is an analog converter which converts a voltage ratio, or simply a voltage, into a second signal which is a direct measure of the grazing angle g.

Figure 4:
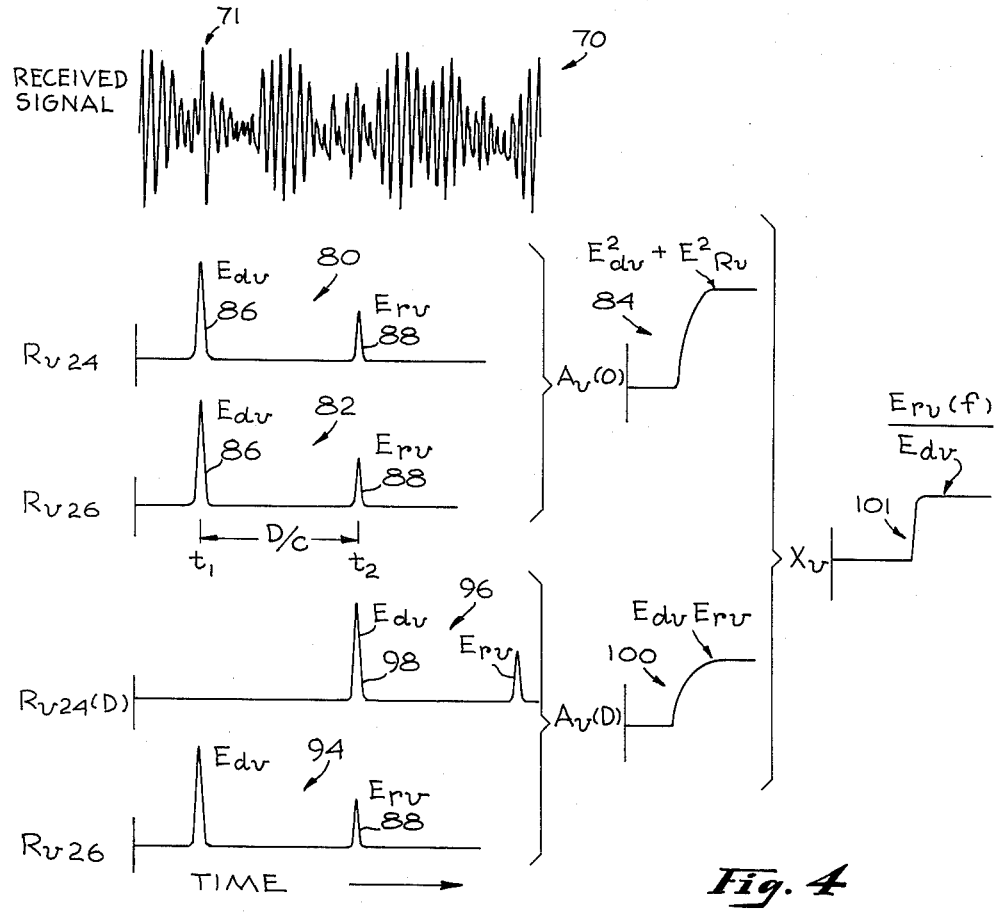
FIG. 4 is a set of graphs of certain signals, associated with the components of FIG. 3, on the multiple ordinates versus time on the abscissa.

In operation, transmitted signal, or noise, from the target craft J may have any known electrical characteristics. For purposes of example and description only, it will be presumed to be a continuous type signal randomly varying in amplitude and frequency as shown at 70 in FIG. 4. For purposes of clarity and ease of description, only a small portion of the signal 70, as shown at 71, will be considered hereafter in the description. This small portion 71 of the signal 70 will be illustrated as a spike or pulse. This signal may be considered to be constituted of four portions at the receiver P: a vertically polarized directly received portion of energy ($E_{dv}$); a vertically polarized portion of energy reflected from the surface S ($E_{rv}$); a horizontally polarized directly received portion of energy ($E_{dh}$); and a horizontally polarized reflected portion of energy ($E_{rh}$). The two vertically polarized components may be considered as entering vertically polarized antenna 20 and being impressed upon both recievers 24 and 26. There is of course a phase or time difference between the arrival of signal pulse portions 71 of $E_{dv}$ and portion 71 of $E_{rv}$. However, considering the substantially continuous signal 70 as a whole, it will be evident that $E_{dv}$ and $E_{rv}$ are concurrently existent at receivers 24 and 26 although specific portions are time displaced by a time dependent upon D. The output of both receivers is illustrated in FIG. 4 by curves 80, 82, respectively, which plot signal strength versus time. The legend $R_{v24}$ indicates the output of receiver 24 which is associated with the vertically polarized antenna. $R_{v26}$ similarly is the output of receiver 26. $R_{v24}$ and $R_{v26}$ are equivalent except for the noise generated by each receiver. The correlator 28 eliminates such receiver noise, because the noise of the two receivers is not related, and provides a direct current output signal $A_v(O)$ illustrated by a curve 84. $R_{v24}$ and $R_{v26}$ are each shown as including a signal 86 which is received at the receiver location at time t, via the direct path R from the target craft J; and at a time $t_2$ which is later by a period corresponding to the path length difference D, the same signal energy designated as signal 88 on the curves is received via the reflective, indirect path $A+B$. The amount of time $t_2-t_1$ equals $D/c$, where c is the velocity of propagation in the appropriate medium. The graphs illustrate that signal 88 is less in amplitude than signal 86, and this is caused by the reflection coefficient for vertically polarized energy being significantly less than unity for the example taken.

As can be seen from the graphs and from the diagram of FIG. 3, correlator 28 receives at its input terminals substantially identical signals, each equal to $E_{dv}$ plus $E_{rv}$. Since these signals are substantially identical, the correlation is substantially perfect, and a maximum output direct-current signal 84 is provided which is representative of square of the sum of the two signals, that is $(E_{dv}+E_{rv})^2$. Since the received signal is continuous, the signal $A_v(O)$ illustrated by curve 84 rises quickly to a steady state value and remains there. It is the steady state value at any predetermined period of time that is particularly of interest.

Curves 94, 96 illusrate the input signals to correlator 34. Curve 94 is simply a repeat of curve 82. Curve 96 is a repeat of curve 80 except that it has been delayed by an amount $D/c$. Correlator 34 therefore finds no correlation between the two signals $R_{v26}$, $R_{v24}(D)$ except between the reflected signal 88 and a direct, but delayed, signal 98 which is simply signal 86 delayed just enough to permit this correlation. The degree of correlation between signals 88, 98 is indicated by a direct current signal portion of a curve 100 plotting gthe output $A_v(D)$ of correlator 34.

Since there is little correlation in correlator 34 between the signals $E_{dv}$ and $E_{rv}$ from receivers 26 and 24, respectively, these signals do not appreciably contribute to the output signal $A_v(D)$. Therfore, the signal $A_v(D)$ is a direct-current signal, the steady state value of which is representative of the direct and reflected, vertically polarized signals multiplied together, that is, $E_{dv} \cdot E_{rv}$. The amplitude of this signal is representative of the degree of correlation, and in practice the delay imparted to the signal $R_{v24}$ by the delay line 30 is adjusted to achieve maximum amplitude.

The output signals $A_v(O)$, $A_v(D)$ of correlators 28, 34, respectively, are then applied to the comparator 36. The comparator 36 provides a direct output signal 101, the amplitude of which is representative of the ratio of the reflected to the directly received signal energy; that is, $$\frac{A_v(D)}{A_v(O)} \text{ or } \frac{E_{dv} \cdot E_{rv}}{(E_{dv}+E_{rv})^2}$$

Since the contribution to the signal $A_v(O)$ by the reflected energy is small compared to that of the directly received energy, it may be ignored for purposes of simplicity of description, thus giving:

$$\frac{E_{dv}E_{rv}}{E^2_{dv}} = \frac{E_{rv}}{E_{dv}}$$

As indicated by the drawings (see curve 101), a factor $(f)$ is applied to the reflected energy $(E_{rv})$ signal. This factor $(f)$ is representative of surface roughness of the reflecting surface. If the surface is smooth, the $(f)$ becomes 1 and may be ignored. Under these conditions, the signal $X_v$ may be used directly as the grazing angle $g$ and the remainder of the system not utilized in such case.

However, if the surface condition is unduly rough, the factor $(f)$ must be applied to eliminate the error introduced by the roughness. For this purpose, the horizontally polarized received signal is dealt with in a manner identical to that above described to obtain an output signal $X_h$ also containing the surface roughness factor $(f)$, that is, $$\frac{E_{rh(f)}}{E_{dh}}$$

By then obtaining the ratio of the two signals $X_v$ and $X_h$ through another comparator 64, the factor $(f)$ is normalized, and a signal representative of the grazing angle is obtained without surface roughness error, that is:

$$\frac{X_v}{X_h} = \frac{\frac{E_{rv(f)}}{E_{dv}}}{\frac{E_{rh(f)}}{E_{dh}}} = \frac{\frac{E_{rv}}{E_{dv}}}{\frac{E_{rh}}{E_{dh}}}$$

This ratio $(Z)$ of the signals $X_v$, $X_h$ is then applied to converter 66, where it is readily converted to an appropriate electrical signal which is representative of the grazing angle $g$.

In the example discussed above, the magnitude of delay presented to the signals by the delay lines 30, 54 is equal to $t_2-t_1$, which is equal to $D/c$. In principle, the magnitude of delay of the delay lines 30, 54 may be adjusted, as by hand, to achieve maximum output of the appropriate correlators 34, 60. Then the amount of delay may be directly read or an electrical analog of the delay magnitude provided at a separate output terminal. In practice, however, the magnitude of time delay provided by delay line 30 is not adjusted by hand; rather, the present invention preferably uses for correlator 34 an apparatus of the "tracking" correlator type. In such apparatus, the delay line 30 is an integral part of the correlator, the time delay is automatically varied or scanned to find the optimum amount of delay for maximum correlation of the two signals 98 and 88, and thereafter the delay is automatically variably controlled to "track" the time difference $D/c$ between the direct signal $E_{dv}$ and the reflected signal $E_{rv}$.

Tracking correlators suitable for use in the present invention and capable of performing the delay tracking functions described above are now well known in the art. For example, one such apparatus is shown and described in detail in U.S. Patent 3,156,817 issued November 10, 1964 to V. R. Briggs and assigned to the assignee of the present application. Another similar signal correlation apparatus for continuously providing an output signal representative of the time displacement between a pair of otherwise coherent signals is shown and described in U.S. Patent No. 2,918,581.

In summary, measurement of the path length difference $D$ is accomplished by measuring the time difference $T=D/c$ required for the signals $E_{dv}$ and $E_{rv}$ transmitted respectively over the direct and reflected paths to reach the receiving aircraft. Specifically, correlator 34, in the apparatus of FIG. 3, preferably includes and automatically controls the delay line 30 and thereby provides an output signal $T=D/c$ representative of the time difference $t_2-t_1$ between corresponding portions of the two vertically polarized signals $E_{dv}$ and $E_{rv}$.

Figure 5:
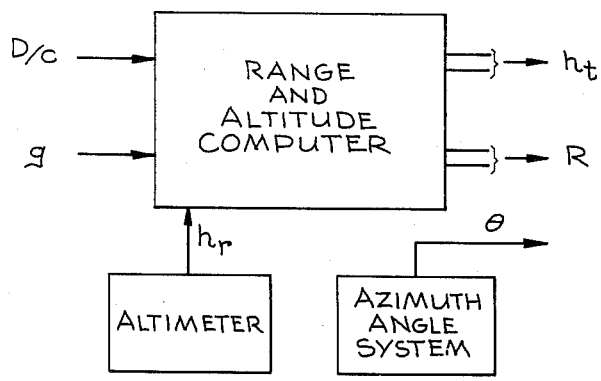
FIG. 5 is a block diagram of additional components in the system of FIG. 3.

Referring to FIG. 5, there are shown additional portions of the system shown in FIG. 3 which were omitted from that figure for purposes of clarity and simplification. The quantities $g$ and $D/c$ or their analogs are fed into a target craft range and altitude computer to provide $R$ and $h_t$ in accordance with the equations derived above. The altitude of the receiver system $h_r$ is also fed in from a conventional altimeter, such as a radar altimeter, on an aircraft carrying the receiver system. In like manner, the azimuth angle $\theta$ to the target craft from the receiver system is supplied from conventional means, such as a radar system or a radio direction finder. Thus, all quantities defining the target craft's location with respect to the receiver location are obtained.

Although various features and concepts of the present invention have been set forth in the foregoing illustrative embodiment, the present invention is not to be limited in accordance therewith, but is to be construed in accordance with the following claims.

The embodiments of the invention in which an exclusive property or privilege is claimed are defined as follows:

1. In a method of determining the elevation angle of a radiating target craft with respect to a receiver, the steps of:
   detecting a first component of vertically polarized energy radiated from said target craft which has been reflected off a horizontal reflective surface at a grazing angle;
   detecting a second component of vertically polarized energy radiated directly from said target craft;
   measuring the ratio of the magnitudes of said first and second components of said vertically polarized energy; and
   determining from said ratio the magnitude of said grazing angle.

2. In a method of determining the location of a polarized electromagnetic energy radiator relative to the location of a receiver, the steps of:
   detecting a first portion of the vertically polarized component of said energy at said receiver which has radiated directly from said radiator;
   detecting a second portion of said vertically polarized component of energy which has radiated indirectly from said radiator by reflecting off a horizontal surface at a grazing angle; and
   determining the magnitude of said grazing angle by comparing the magnitudes of said first and second portions of said vertically polarized component.

3. In a method of determining the position in a vertical plane of a radiating source of electromagnetic vertically polarized energy with respect to the position of a receiver of said energy in the same vertical plane, the steps of:
   detecting at said receiver a first portion of said energy radiated along a first path directly from said source;
   detecting a second portion of said energy radiated along a second path from said source and reflected from a horizontal reflecting surface at a grazing angle;
   measuring the ratio of the magnitudes of said first and second portions;
   determining the magnitude of said grazing angle from said ratio; and
   determining the difference between the lengths of said first and second paths.

4. In a method of determining, with respect to an airborne receiver, the position in a vertical plane of an airborne target craft radiating electromagnetic energy including at least in part a vertically polarized component to said receiver over a direct and a reflective path, the steps of:
   detecting a first and a second portion of said vertically polarized energy at said receiver, said first and second portions being respectively the energy associated with said direct path and with said reflective path;
   measuring the ratio of the magnitudes of said first and second portions;
   determining from said ratio the angle of reflection of said reflective path;
   making a comparison of a part of said first and second portions; and
   determining from said comparison the path length difference between said direct and reflective paths.

5. The method of determining, with respect to an elevated receiver, the position in a vertical plane of an elevated target craft radiating or reflecting two portions of electromagnetic energy to said receiver over, respectively, a direct path and an indirect path, the latter including a reflection from a horizontal reflective surface, the method comprising:
   receiving the vertically polarized components of both said portions;
   dividing said vertically polarized components into first and second signals;
   amplifying said first and second signals in separate receivers;
   correlating the amplified said first and said second signals and developing a correlation function $A_v(O)$;
   delaying said first signal for a time period D equal to the path time difference between said direct and indirect paths;
   correlating the delayed said first signal with said second signal and developing a correlation function $A_v(D)$;
   comparing the magnitude of said functions $A_v(O)$ and $A_v(D)$ and generating a vertical comparison function $X_v$;
   transforming said vertical comparison function into the magnitude of the angle of said reflection; and
   computing from the magnitude of said angle and D and known quantities the elevation angle, range to and altitude of said target craft.

6. The method of determining, with respect to an airborne receiver, the position in a vertical plane of an airborne target craft radiating or reflecting two portions of electromagnetic energy to said receiver, over, respectively, a direct path and an indirect path, the latter including a reflection from a horizontal reflective surface, the method comprising:
   receiving the vertically polarized components of both said portions;
   dividing said vertically polarized components into first and second signals;
   amplifying said first and second signals in separate receivers;
   correlating the amplified said first and second signals and developing a correlation function $A_v(O)$;
   delaying said first signal for a time period D equal to the path time difference between said direct and indirect paths;
   correlating the delayed said first signal with said second signal and developing a correlation function $A_v(D)$;
   comparing the magnitude of said functions $A_v(O)$ and $A_v(D)$ and generating a vertical comparison function $X_v$;
   performing in like manner said receiving, dividing, amplifying, correlating, delaying, and comparing steps with respect to the horizontally polarized components of both said portions and generating a horizontal comparison function $X_h$;
   comparing said functions $X_v$ and $X_h$ and developing their ratio Z;
   transforming said ratio Z into the magnitude of the angle of said reflection; and
   computing from the magnitude of said angle and D and known quantities the elevation angle, range to and altitude of said target craft.

7. In a system for determining, with respect to an airborne receiver, the position in a vertical plane of an airborne target craft radiating or reflecting electromagnetic energy toward the receiver via, in part, an indirect path including a reflection at a grazing angle from off a horizontal reflective surface, the combination of:
   a vertically polarized antenna at said receiver;
   means coupled to said antenna for correlating that part of said energy emanating over said indirect path with that emanating directly toward said receiver;
   comparator means coupled to said means for correlating for determining the ratio of the magnitudes of said part of said energy emanating over said indirect path and that emanating directly toward said receiver; and
   converter means for translating said ratio into a signal representative of the magnitude of said grazing angle.

8. In a system for determining, with respect to an airborne receiver, the position in a vertical plane of an aircraft radiating or reflecting electromagnetic energy toward the receiver over a direct and an indirect path including a reflection at a grazing angle from a horizontal reflective surface, the combination of:
- an antenna system at said receiver for receiving said energy;
- means associated with said antenna system for separating the vertically and horizontally polarized components of said energy; and
- comparator means coupled to the above said means for determining the ratio of the magnitudes of said vertically and said horizontally polarized components.

9. In a system for determining, with respect to an airborne receiver, the position in a vertical plane of an airborne target craft radiating or reflecting electromagnetic energy toward the receiver in part via an indirect path including a reflection from a horizontal reflective surface and in part via a direct path from said target craft to said receiver, the combination of:
- a vertically polarized antenna for receiving the vertically polarized component of said energy;
- first and second receivers each coupled to said antenna and each having an output terminal;
- a first correlator coupled to said output terminals of said receivers and having an output terminal;
- a second correlator coupled to the output terminals of said receivers and having an output terminal;
- a variable delay line means interposed in the coupling between one of said receivers and said second correlator;
- a comparator coupled to the output terminals of said first and second correlators and having an output terminal; and
- a converter coupled to the output terminal of said comparator for producing an electrical signal representative of the angle at which a portion of said energy is reflected from said horizontal surface.

10. In a system for determining, with respect to an airborne receiver, the position in a vertical plane of a target aircraft radiating or reflecting electromagnetic energy toward the receiver in part via an indirect path including a reflection from a horizontal reflective surface and in part via a direct path from said target aircraft to said receiver, the combination comprising:
- a vertically polarized antenna for receiving the vertically polarized component of said energy;
- first and second signal receiving means each coupled to said antenna and each having an output terminal;
- a first correlator coupled to said output terminals of said signal receiving means and having an output terminal;
- a second correlator coupled to the output terminals of said signal receiving means and having an output terminal;
- a first variable delay means interposed between one of said signal receiving means and said second correlator;
- a first comparator coupled to the output terminals of said first and second correlators and having an output terminal;
- a horizontally polarized antenna for receiving the horizontally polarized components of said energy;
- third and fourth signal receiving means each coupled to said horizontally polarized antenna and each having an output terminal;
- a third correlator coupled to the output terminals of said third and fourth signal receiving means and having an output terminal;
- a fourth correlator coupled to the output terminals of said third and fourth signal receiving means and having an output terminal;
- a second variable delay means interposed between said fourth correlator and one of said third and fourth signal receiving means;
- a second comparator coupled to said output terminals of said third and fourth correlators and having an output terminal; and
- a third comparator coupled to said output terminals of said first and second comparators for developing a signal indicative of the relative magnitudes of said vertically and horizontally polarized components.

References Cited by the Examiner
UNITED STATES PATENTS

| | | | |
|---|---|---|---|
| 2,134,535 | 10/38 | Runge | 343—12 |
| 2,837,738 | 6/58 | Van Valkenburgh | 343—112 |
| 2,907,028 | 9/59 | Stirton et al. | 343—100 X |

CHESTER L. JUSTUS, *Primary Examiner.*